(12) United States Patent
Watanabe (10) Patent No.: US 10,190,356 B2
(45) Date of Patent: Jan. 29, 2019

(54) POWER DOOR OPENING AND CLOSING DEVICE

(71) Applicant: MITSUI KINZOKU ACT CORPORATION, Yokohama-shi, Kanagawa (JP)

(72) Inventor: Yasuyuki Watanabe, Yokohama (JP)

(73) Assignee: MITSUI KINZOKU ACT CORPORATION, Yokohama-shi (JP)

( * ) Notice: Subject to any disclaimer, the term of this patent is extended or adjusted under 35 U.S.C. 154(b) by 78 days.

(21) Appl. No.: 15/305,358

(22) PCT Filed: Dec. 9, 2014

(86) PCT No.: PCT/JP2014/082592
§ 371 (c)(1),
(2) Date: Oct. 20, 2016

(87) PCT Pub. No.: WO2015/186275
PCT Pub. Date: Dec. 10, 2015

(65) Prior Publication Data
US 2017/0081900 A1 Mar. 23, 2017

(30) Foreign Application Priority Data

Jun. 5, 2014 (JP) ................................. 2014-116423

(51) Int. Cl.
*E05F 15/73* (2015.01)
*E05F 15/63* (2015.01)
(Continued)

(52) U.S. Cl.
CPC .............. *E05F 15/73* (2015.01); *B60J 5/101* (2013.01); *E05F 1/1091* (2013.01); *E05F 15/63* (2015.01);
(Continued)

(58) Field of Classification Search
None
See application file for complete search history.

(56) References Cited

U.S. PATENT DOCUMENTS 5,982,126 A * 11/1999 Hellinga .................... B60J 5/06
   318/286
6,755,458 B1 * 6/2004 Oberheide ............ E05F 1/1091
   296/146.8

(Continued)

FOREIGN PATENT DOCUMENTS

JP        2001-10345 A     1/2001
JP          3923704 B     10/2001
(Continued)

OTHER PUBLICATIONS

International Search Report Corresponding to PCT/JP2014/082592 dated Mar. 3, 2015.

*Primary Examiner* — Catherine A Kelly
(74) *Attorney, Agent, or Firm* — Davis & Bujold PLLC; Michael J. Bujold (57) ABSTRACT

A power door opening device that shortens time from start of manual operation to assistance starting. The device comprises an actuator that assists a motion for opening and closing a door supported by a vehicle body; a door-end sensor that detects the motion of the door; and a control that carries out opening/closing control of the actuator on the basis that the door-end sensor detects the motion of the end of the door.

5 Claims, 7 Drawing Sheets

(51) Int. Cl.
*E05F 1/10* (2006.01)
*B60J 5/10* (2006.01)

(52) U.S. Cl.
CPC ....... *E05Y 2201/72* (2013.01); *E05Y 2400/36* (2013.01); *E05Y 2800/113* (2013.01); *E05Y 2900/546* (2013.01)

(56) References Cited

U.S. PATENT DOCUMENTS

| | | | | |
|---|---|---|---|---|
| 6,901,704 B2 * | 6/2005 | Sakaue | ............... | E05F 15/63 296/56 |
| 7,070,226 B2 * | 7/2006 | Cleland | ............... | E05F 1/1091 296/146.8 |
| 7,290,823 B2 * | 11/2007 | Kleinmann | ........... | E05F 15/619 296/146.8 |
| 7,556,304 B2 * | 7/2009 | Buescher | .............. | E05F 1/1091 296/56 |
| 7,866,728 B2 | 1/2011 | Suzuki | | |
| 2006/0181108 A1 * | 8/2006 | Cleland | ................... | E05F 15/43 296/146.4 |
| 2009/0032325 A1 | 2/2009 | Frieb-Preis et al. | | |
| 2015/0096233 A1 * | 4/2015 | Kojima | .................... | H02P 3/14 49/31 |
| 2016/0087565 A1 * | 3/2016 | Watanabe | .................. | B60J 5/04 318/503 |
| 2017/0044815 A1 * | 2/2017 | Watanabe | ............... | E05F 15/70 |

FOREIGN PATENT DOCUMENTS

| | | |
|---|---|---|
| JP | 2002-364249 A | 12/2002 |
| JP | 2005-155311 A | 6/2005 |
| JP | 2005-336772 A | 12/2005 |
| JP | 2009-13779 A1 | 1/2009 |
| JP | 2009-108605 A | 5/2009 |

* cited by examiner

(a) OPENING ACTION (b) CLOSING ACTION

Fig. 7

POWER DOOR OPENING AND CLOSING DEVICE

BACKGROUND OF THE INVENTION

This application is a National Stage completion of PCT/JP2014/082592 filed Dec. 9, 2014, which claims priority from Japanese patent application serial no. 2014-116423 filed Jun. 5, 2015.

The present invention relates to a power door opening and closing device that applies assistant force to manual opening/closing operation of a door.

A power door opening and closing device used in a liftgate pivotally mounted to open and close vertically at the rear end of a vehicle body comprises an actuator that comprises a motor, a reduction mechanism for slowing down the motor and a rotary encoder for generating a pulse signal corresponding to opening/closing motion of the liftgate. An output portion of the actuator is connected to the liftgate and an operator opens and closes the liftgate manually. The rotary encoder detects opening/closing motion of the liftgate so as to start the motor and to apply an assistant force to manual opening/closing operation in JP3923704B2.

However, in the power opening device in JP3923704B2, looseness inevitably occurs at a connecting path between the actuator and the liftgate. A time delay corresponding to the looseness is generated until the rotary encoder in the actuator detects motion of the liftgate since the operator starts manual operation, so that an assistant force cannot be applied rapidly, which is a problem.

Thus, a great operating force is required at the beginning of manual operation of the liftgate, and when the assistant force is applied, catching is felt to cause discomfort in manual operation.

SUMMARY OF THE INVENTION

In view of the disadvantage, it is an object of the invention to provide a power door opening and closing device that shortens time between start of manual operation and start of assistance, improving performance in manual operation.

DETAILED DESCRIPTION OF PREFERRED EMBODIMENT

Figure 1:
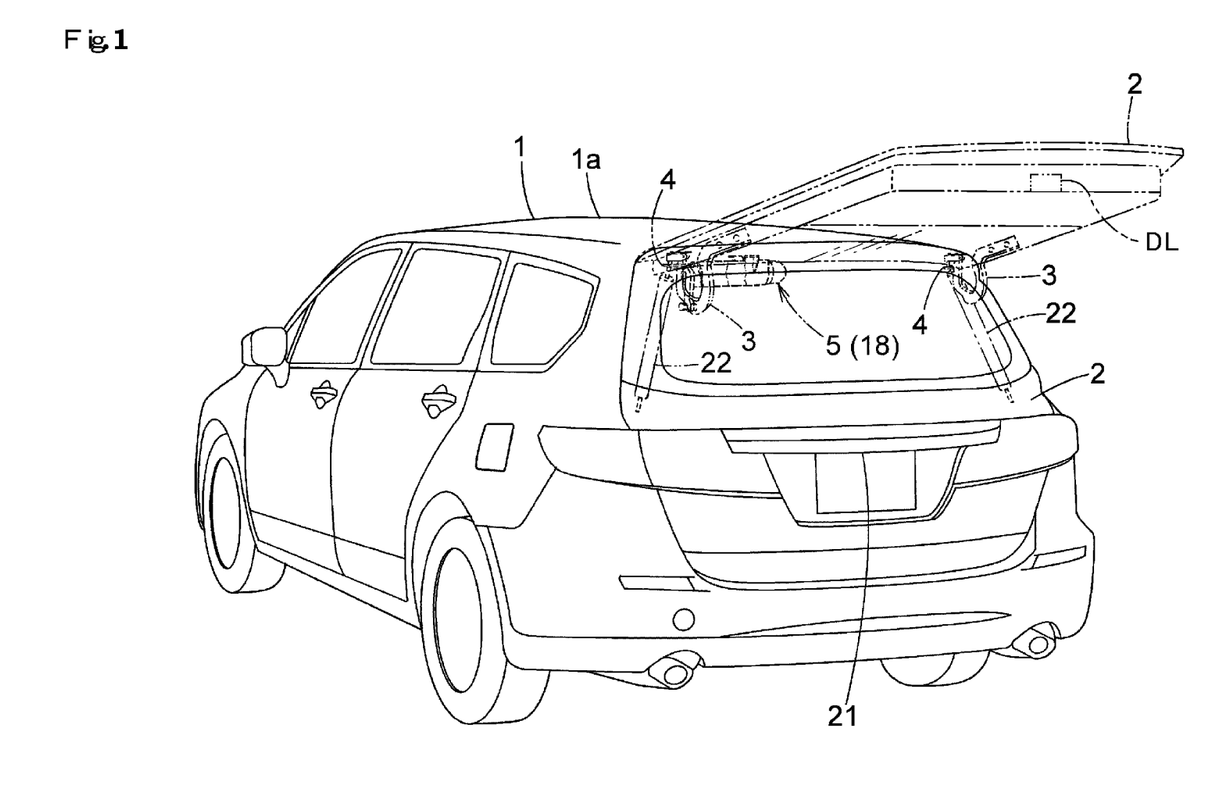
FIG. 1 is a perspective view of a vehicle to which a power door opening and closing device of the present invention is applied.

One embodiment for carrying out the present invention will be described. FIG. 1 is a perspective view of a vehicle that comprises a power door opening and closing device according to the present invention viewed from back. On the upper rear part of a vehicle body 1, the upper end of a liftgate 2 is supported via a pivot shaft 4 with a pair of door hinges 3 and raised to open and close vertically.

Figure 2:
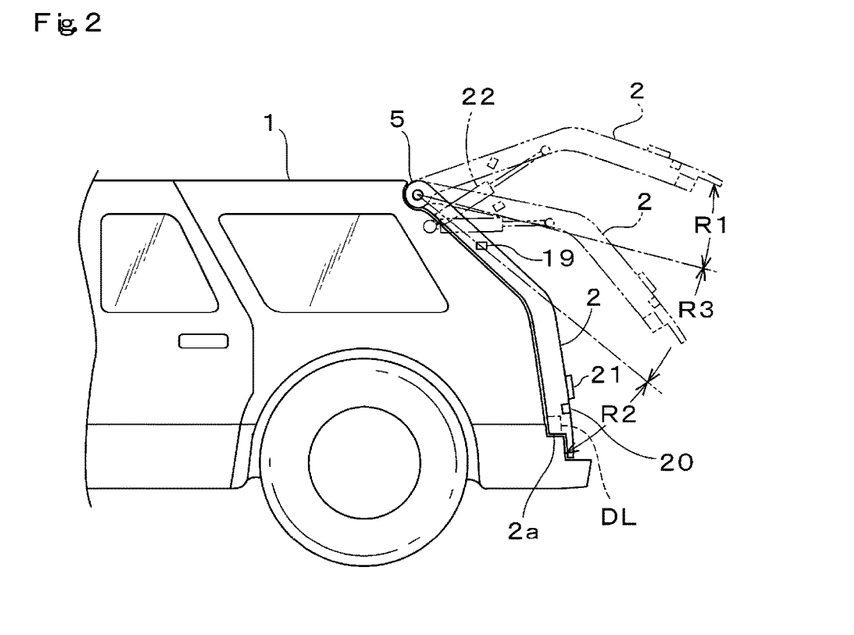
FIG. 2 is a schematic side elevational view of the rear part of the vehicle.

The liftgate 2 is opened normally and closed reversely by a drive force of an actuator 5 at the upper rear part of the vehicle body 1 and by an assisting force manually for the actuator 5 from a fully-closed position shown by solid lines in FIG. 2 to a fully-open position shown by alternate long and two short dashes lines via an intermediate position shown by alternate long and two short dashes lines.

Figure 3:
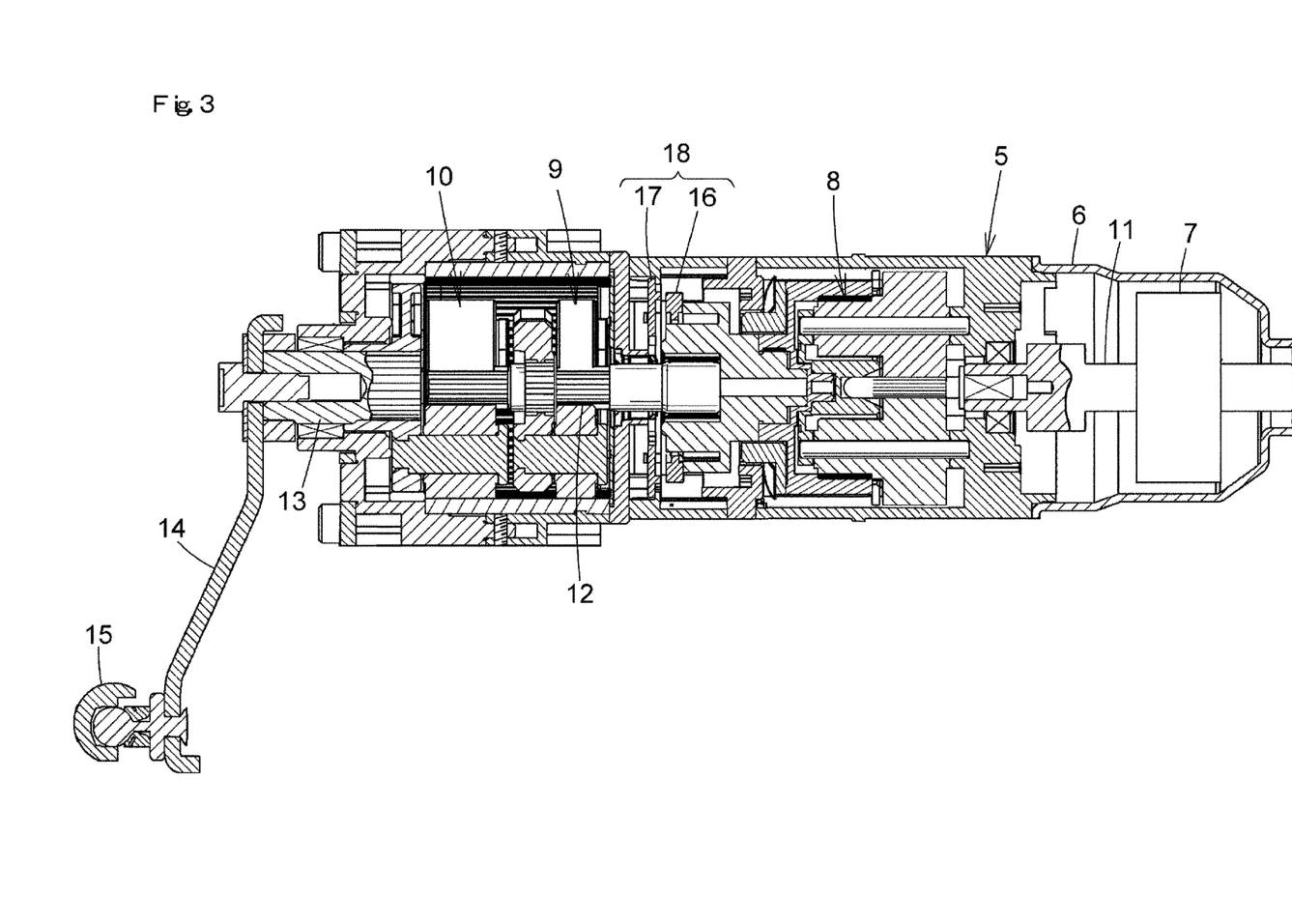
FIG. 3 is a vertical sectional back view of an actuator.

The actuator 5 is disposed in a roof 1a of the vehicle body 1 and comprises a tubular casing 6.

The structure of the actuator 5 does not directly relate to the present invention. Hence, parts relating to the present invention and schematic whole structure are only described and the other explanation of the actuator 5 will not be described.

The detailed structure of the actuator 5 are described in the specification and drawings of Japanese Patent Application No. 2014-82414 filed by the same applicant.

Within the casing 6 of the actuator 5, a motor 7, a first planetary gear mechanism 8, a second planetary gear mechanism 9 and a third planetary gear mechanism 10 are disposed. A rotating force of a rotary shaft 11 of the motor 7 is transmitted to an intermediate shaft 12 and an output shaft 13 on the same axis while slowing down. An arm 14 fixed to the end of the output shaft 13 is coupled to the left door hinge 3 via a link 15. By rotating the rotary shaft 11 of the motor 7 in a predetermined direction, the liftgate 2 is opened toward the fully-open position, and by rotating the rotary shaft 11 reversely, the liftgate 2 is closed toward the fully-closed position.

Around the intermediate shaft 12, there is disposed a magnetic ring 16 on which one or more permanent magnets (not shown) are provided circumferentially so as to rotate together with the intermediate shaft 12 with other gears.

In the casing 6, a sensor base plate 17 that has a sensor (not shown) such as a hole element faces the magnetic ring 16 and is fixed to the casing 6 to rotate together. The sensor base plates 17 and the magnetic ring 16 constitute a built in sensor 18 for generating a pulse with opening/closing motion of the liftgate 2. A rotary encoder may be provided for the built in sensor 18.

At a lower end 2a of the liftgate 2 in the fully-closed position, there is a door-end sensor 20 for detecting opening/closing motion of the end 2a, and a temperature sensor 19 for detecting circumferential temperature of a gas spring 22 (later described) on the gas spring 22 or close thereto.

The door-end sensor 20 is, for example, a one-axis analogue gyro angular velocity sensor, but may be any type for detecting an angle of the end 2a of the liftgate 2 and angular variation thereof.

Signals generated by the built in sensor 18, the temperature sensor 19 and the door-end sensor 20 are transmitted to a control 23 in the vehicle.

There are attached a door lock unit DL that engages with a striker (not shown) of the vehicle body to hold the liftgate 2 in the fully-closed position at the lower end 2a of the liftgate 2, and a release switch 21 which disengages the door lock unit DL from the striker to open the liftgate 2 manually at the rear surface.

At each side of the rear end of the vehicle body 1, the gas spring 22 is provided to force the liftgate 2 to open so as to reduce an opening force of the liftgate 2.

As shown in FIG. 2, the force of the gas spring 22 acting on the liftgate 2 is set as a force that raises the liftgate 2 to the fully-open position when the liftgate 2 is disposed within an opening area R1 with the fully-open position; as a force by which the liftgate 2 is closed by its own weight when the liftgate 2 is disposed within a closing area R2 with the fully-closed position; and as a force that balances a force by which the liftgate 2 is closed by its own weight when the liftgate 2 is disposed within an intermediate area R3 between the opening area R1 and the closing area R2.

Figure 4:
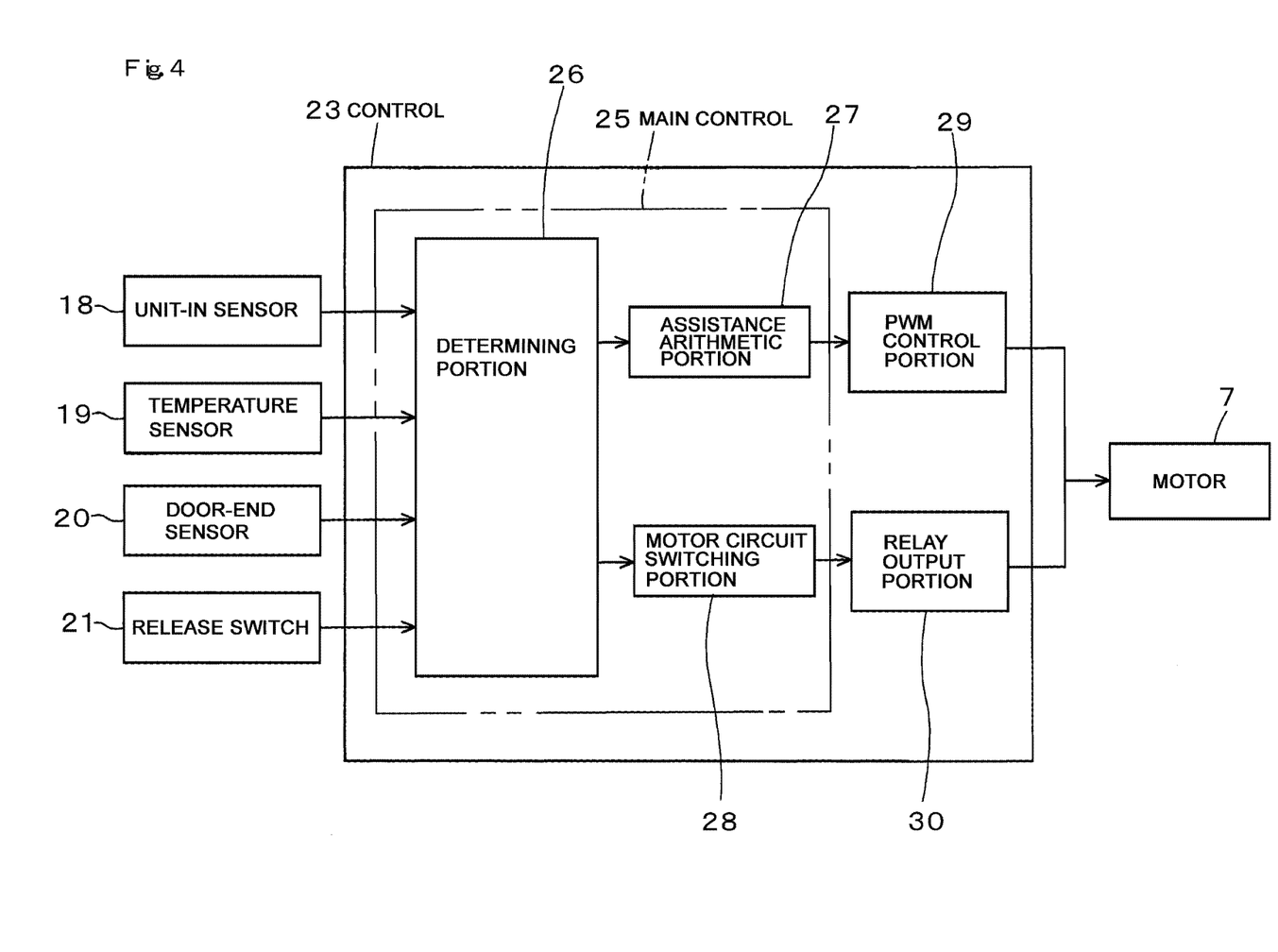
FIG. 4 is a block diagram of a control.

Then, a circuit of the control 23 will be described with FIG. 4.

The control 23 comprises a main control portion 25 that is a microprocessor that performs a set of control treatment according to instructions of control program stored in an internal memory; a pulse width modulation (PWM) control portion 29 that controls voltage that applies to the motor 7 based on PWM control instructed by the main control portion 25; and a relay output portion 30 that can be switched to drive the motor 7 normally and reversely according to instructions from the main control portion 25.

A signal is supplied from the built in sensor 18, the temperature sensor 19, the door-end sensor 20 and the release switch 21 for detecting that an operator operates the liftgate manually, into input ports of the control 23, and the motor 7 is electrically connected to output ports via the PWM control portion 29 and the relay output portion 30.

The main control portion 25 comprises a determining portion 26 for determining whether the liftgate 2 is operated manually based on a detecting signal from the built in sensor 18 and the door-end sensor 20; an assistance operating portion 27 for determining duty ratio of PWM control based on arithmetic results operated by the determining portion 26; and a motor circuit turning portion for controlling ON/OFF of the relay output portion 30 based on treatment results operated by the determining portion 26.

On the assumption that the motor 7 is at rest, the determining portion 26 determines that the liftgate 2 is manually operated, when the built in sensor 18 generates a pulse signal of more than predetermined number, such as more than four with pulses shorter than a predetermined length or when the door-end sensor 20 generates an angular variable signal, thereby transmitting an manually-operating command with temperature data corresponding to detected temperature of the temperature sensor 15 to the assistance arithmetic portion 27 and transmitting a motor control command to the motor-circuit switching portion 28. Furthermore, the determining portion 26 analyzes the number, width and intervals of the pulse signal supplied from the built in sensor 18 to detect the position, moving amount, opening/closing velocity, acceleration and moving direction, and analyzes an angular signal from the door-end sensor 20 to detect an angle and movement (angular variation) of the liftgate 2 when the vehicle is parked.

The assistance arithmetic portion 27 determines duty ratio as below based on the manually-operating command from the determining portion 26, and controls the PWM control 29.

Figure 6:
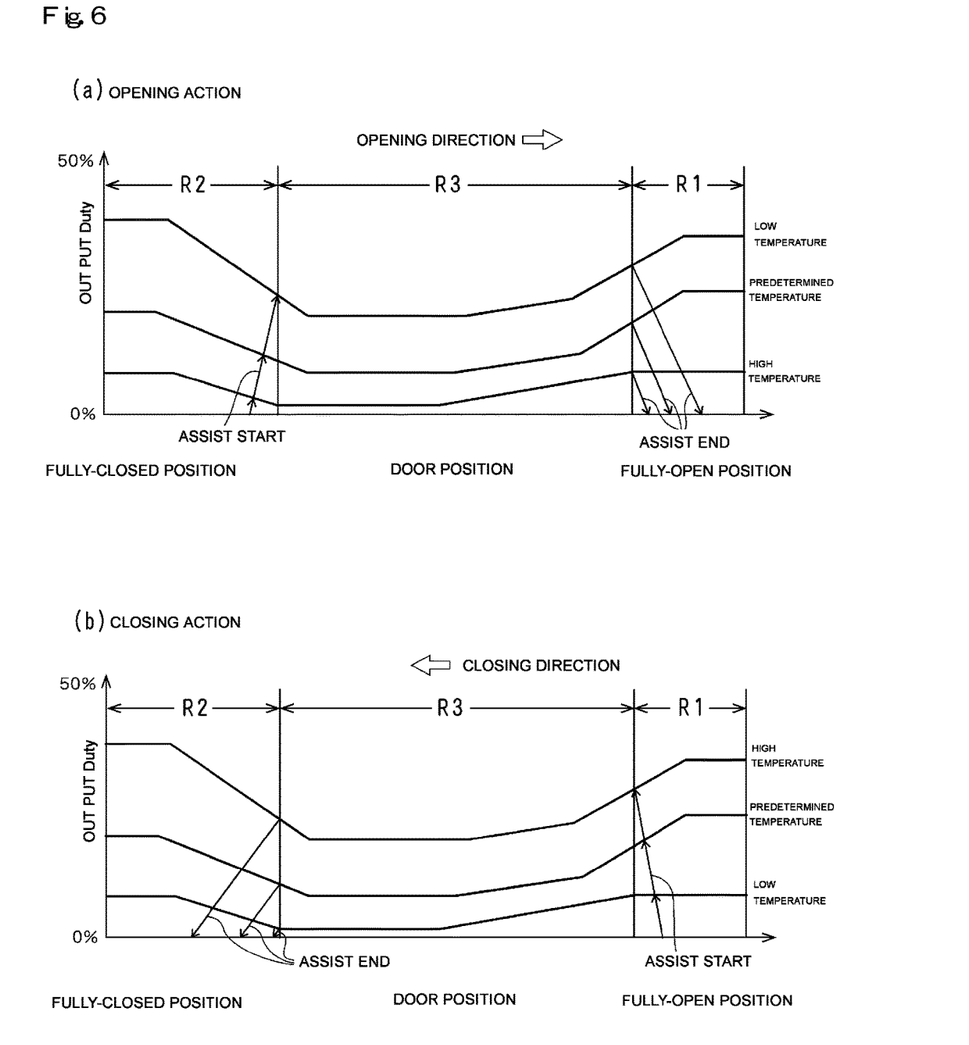
FIGS. 6A and 6B are views showing one example of a relationship between a door position and an assistant force.

In FIG. 6, PWM control is performed corresponding to the temperature (circumferential temperature of the gas spring 22) detected by the temperature sensor 19.

For example, in FIG. 6(a), when the liftgate 1 opens, as the circumferential temperature becomes higher than a predetermined temperature, duty ratio gets smaller to reduce assistant force applied to the liftgate 2 to decrease the power of the motor. As the circumferential temperature becomes lower than the predetermined temperature, the duty ratio gets greater to increase assistant force applied to the liftgate 2 to increase the power of the motor 7.

In FIG. 6(b), when the liftgate 1 is closed, as the circumferential temperature becomes higher than the predetermined temperature, duty ratio gets greater to increase assistant force applied to the lift gate to reduce the power of the motor 7.

Gas pressure of the gas spring varies with circumferential temperature (The higher the circumferential temperature, the higher gas pressure, and the lower the circumferential temperature the lower the gas pressure to decrease a force). Even if opening force that acts on the liftgate 2 varies, assistant force applied to the liftgate 2 in opening and closing can be a force suitable for the circumferential temperature.

PWM control is performed corresponding to an open position of the liftgate 2 detected by the built in sensor 18. In FIGS. 6(a), (b), when the liftgate 2 moves within the intermediate area R3, amending control for reducing duty ratio is performed to weaken assistant force gradually.

PWM control is performed corresponding to opening/closing velocity of the liftgate 2. For example, amending control is performed to increase duty ratio as manual opening/closing velocity of the liftgate 2 gets higher and to reduce duty ratio as it gets lower. Thus, assistant force is applied corresponding to manual opening/closing velocity of the liftgate 2, thereby performing high follow-up assisting control and operating the liftgate 2 naturally and manually.

Duty ratio is determined corresponding to vehicle posture in parking or an angle of the liftgate 2 in a fully-closed position, and based on the duty ratio, initial assisting control is performed to open the liftgate from the fully-closed position. The angle of the liftgate 2 in the fully-closed position is detected by the door-end sensor 20.

For example, when the vehicle parking posture tilts backward and downward, initial operating force for opening the liftgate 2 is greater than when the parking posture is horizontal. Amending control is performed so that duty ratio gets higher than the predetermined value.

If there is no manual operation command from determining portion 26, assistant control will stop. For example, if a pulse signal is not supplied from the built in sensor 18 for more than predetermined time or if an angular variation signal is not supplied from the door-end signal, the motor 5 will stop.

When manual opening/closing operation of the liftgate 2 is switched from NO to YES for assistance and vice versa, duty ratio increases and decreases gradually so as to overcome discomfort in manual opening/closing.

Figure 5:
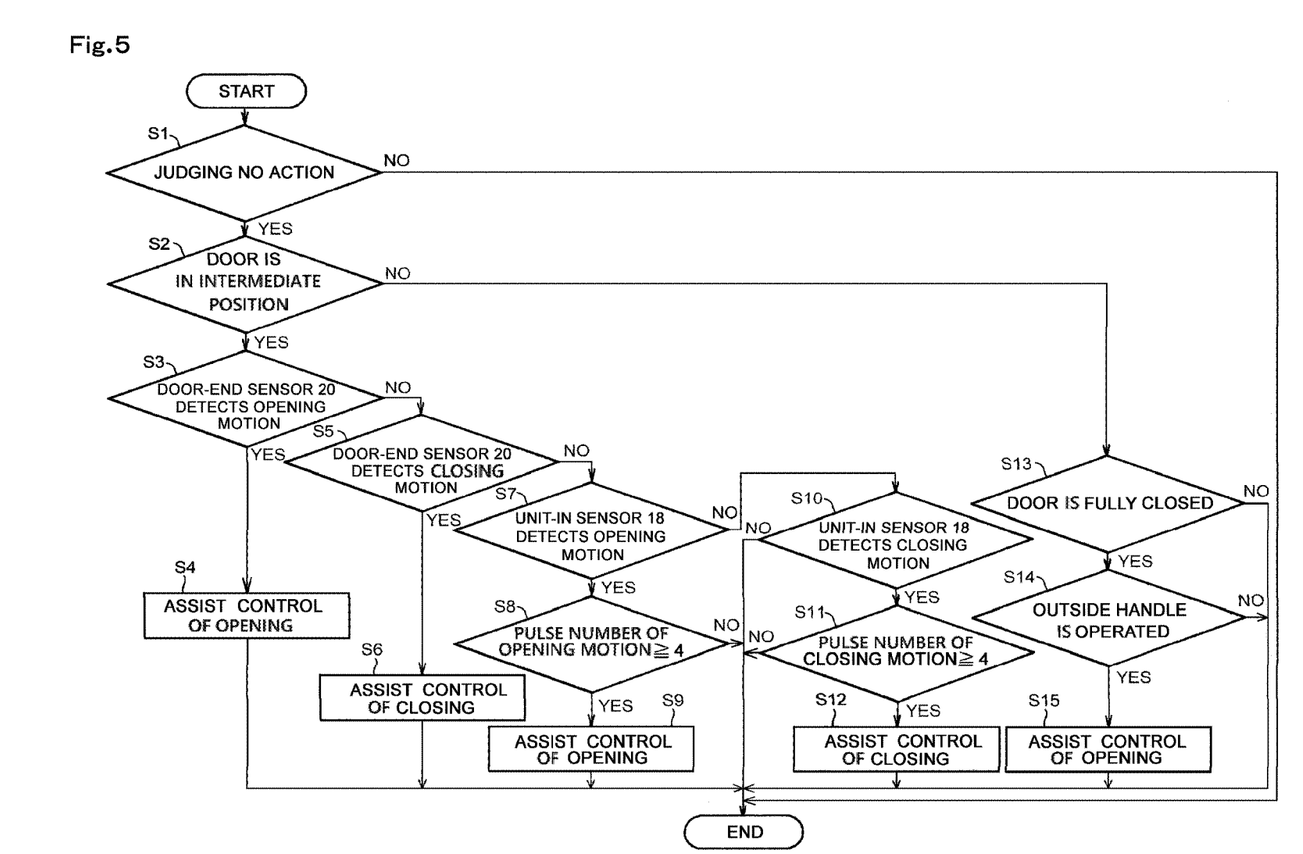
FIG. 5 is a flow chart showing assistant operation when a door is manually operated.

Assistance control will be described when the liftgate 2 is manually operated with respect to a flow chart in FIG. 5.

The step S1 shows that no signal is supplied to the control or the liftgate 2 is not operated. In the step S2, when the control 23 determines YES that the liftgate 2 is in the intermediate position between the fully-closed position and the fully-open position, and the door-end sensor 20 detects an opening motion in the step S3. The determining portion 26 transmits manual operation command to the assistance arithmetic portion 27, and transmits an opening circuit closing command. The assistance arithmetic portion 27 calculates the optimum assistant force based on the manual operation command with the position and opening velocity of the liftgate 2 and circumferential temperature of the gas spring 22, and controls the PWM control portion 29 owing to duty ratio based on the operated results. Thus, the motor 7 rotates to open the liftgate 2 by closing the opening circuit of the relay output portion 30 in the step S4. In this case, application of assistant force to the liftgate 2 starts by detecting a motion of the door-end sensor 20 to open the liftgate 2. Just after the liftgate 2 moves to open, the motor 7 starts and applies assistant force to the liftgate 2, so that the liftgate 2 is operated manually and naturally.

In the step S3, when the door-end sensor 20 does not detect an opening motion, but detects a closing motion in the step S5, the determining portion 26 transmits manual operation command to the assistance arithmetic portion 27 and transmits closing-circuit closing command to the motor circuit switching portion 28. The assistance arithmetic portion 27 calculates the optimum assistance force based on manual operation command from the determining portion 26 based on the position and closing velocity of the liftgate 2 and circumferential temperature of the gas spring 22, and controls the PWM control portion 29 with duty ratio based on the operated results. Thus, the motor 7 rotates to close the liftgate 2 by closing the closing circuit of the relay output portion 30 and applies closing assistant force to the liftgate 2 in the step S6. In this case, application of assistant force to the liftgate 2 starts by detecting closing motion of the door-end sensor 20, and just after the liftgate 2 closes, the motor 7 starts and assistant force can be applied to the liftgate 2 rapidly, so that the liftgate 2 can be operated manually and naturally.

In the step S5, if the built in sensor 18 detects an opening motion in the step S7 and the built in sensor 18 continuously generates more than four pulse signals (the number can be determined optionally) in the step S8 before the door-end sensor 20 detects a closing motion under any reason, the determining portion 26 transmits a manual operation command to the assistance arithmetic portion 27 and transmits an opening circuit closing command to the motor circuit switching portion 28. The assistance arithmetic portion 27 calculates the optimum assistant force based on the manual operation command with the position and opening velocity of the liftgate 2 and circumferential temperature of the gas spring 22, and controls the PWM control portion 29 with duty ratio based on the operated results. Thus, the motor 7 rotates to open the liftgate 2 by closing the opening circuit of the relay output portion 30 and applies an opening assistant force to the liftgate 2 in the step S4.

In the step S7, if the built in sensor 10 does not detect an opening motion, but detects a closing motion in the step S10, and supplies more than four pulse signals (the number is determined optionally) continuously in the step S11, the determining portion 26 transmits a manual operation command to the assistance arithmetic portion 27 and transmits a closing circuit closing command to the motor circuit switching portion 28. The assistance arithmetic portion 27 calculates the optimum assistant force based on the manual operation command from the determining portion 26 with the position and opening velocity of the liftgate 2 and circumferential temperature of the gas spring 22, and controls the PWM control portion 29 with duty ratio based on the operated results. Thus, the motor 7 rotates to close the liftgate 2 by closing the closing circuit and applies a closing assistant force to the liftgate 2 in the step S12.

If it is not detected that the liftgate 2 is in the intermediate position in the step S2, but in the fully-closed position in the step S13, and, in this state, if it is detected that the release switch 21 is operated and that the door lock unit DL disengages from the striker in the step S14, the determining portion 26 transmits a manual operation command to the assistance arithmetic portion 27 and transmits an opening circuit closing command to the motor circuit switching portion 28. The assistance arithmetic portion 27 calculates the optimum assistant force based on the manual operation command with the angle detected by the door-end sensor 20 and circumferential temperature of the gas spring 22, and controls the PWM control portion 29 with duty ratio based on the operated results. Thus, the motor 7 rotates to open the liftgate 2 by closing the opening circuit of the relay output portion 30 and applies an opening assistant force to the liftgate 2 in the step S15.

From the above, in the power door opening and closing device in this embodiment, the door-end sensor 20 that can detect opening/closing of the liftgate 2 sensitively is disposed at the end 2a of the liftgate 2. Thus, when the liftgate 2 is manually operated, the device sensitively detects opening/closing motion of the liftgate 2 and can shorten time from the starting of the manual operation to the assistance starting, thereby improving performance in manual operation.

The embodiments of the present invention is described, but without departing from the gist of the invention, the following changes and modification may be made to the embodiment.

Figure 7:
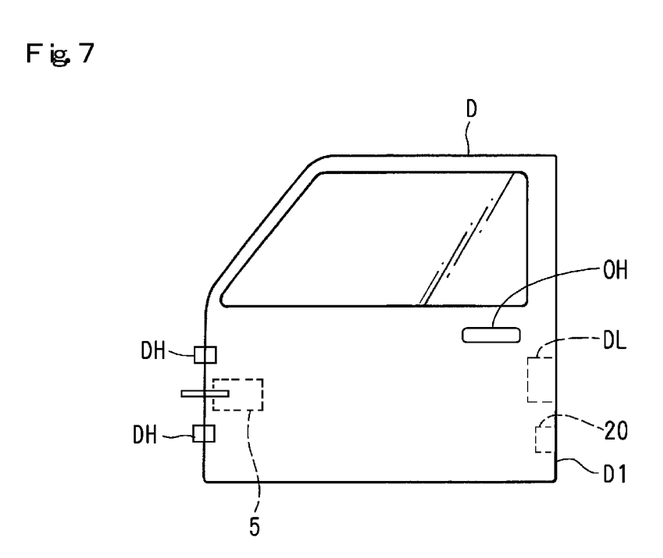
FIG. 7 is a schematic side elevational view of a side door in another embodiment.

In FIG. 7, the door-end sensor 20 is provided at the end D1 of a side door D and an actuator 5 similar to that in the foregoing embodiment is disposed at the side door D. Thus, an assistant force is applied to manual opening/closing operation of the side door D by starting the actuator 5. In such structure, similar advantages to the foregoing embodiment can be attained. In this case, the present invention may be carried out without the gas spring 20.

The side door D is pivotally mounted around a vertical shaft via a door hinge at the side of a vehicle body. There are a door lock unit that engages with a striker of a vehicle body at the end D1 to hold the side door D closed, and an outside handle for opening the side door D on the external side.

What is claimed is:

1. A power door opening and closing device comprising:
    an actuator comprising a motor for assisting an operating force to open and close a door supported by a vehicle body, and a control for driving the motor of the actuator to open and close the door,
    wherein a built-in sensor comprising a magnetic ring, rotating according to opening and closing motions of the door, is disposed in the actuator, and an angular velocity sensor is disposed at a distal end of the door for detecting a motion of the distal end of the door; and
    wherein when the motor of the actuator is at rest and the control determines that the door is in an intermediate position between a fully-closed position and a fully-open position, when the angular velocity sensor detects the motion of the distal end of the door in an opening direction or a closing direction, or when the built-in sensor in the actuator detects the rotation of the magnetic ring before the angular velocity sensor detects the motion of the door, the control determines that the door is being manually operated, and the control drives the motor of the actuator to open and/or close the door based on the determination of the manual operation of the door.

2. The power door opening and closing device according to claim 1, wherein the door is a liftgate that opens and closes vertically, and the liftgate is urged at least in the opening direction by a force of a gas spring, the gas spring is constructed so that the force applied to the liftgate changes with a circumferential temperature detected by a temperature sensor disposed at the gas spring or adjacent to the gas spring, and the control drives the motor of the actuator at a duty ratio determined according to the circumferential temperature.

3. The power door opening and closing device according to claim 1, wherein the control drives the motor of the actuator at a duty ratio determined according to an angle of the door.

4. The power door opening and closing device according to claim 2, wherein the gas spring is disposed at each side of a rear end of the vehicle body to reduce an opening force of the liftgate.

5. The power door opening and closing device according to claim 1, wherein when the built-in sensor generates continuously pulsed signals having a length shorter than a predetermined length in a predetermined number or more, the control determines, according to the detection by the built-in sensor, that the door is being manually operated.

* * * * *